US009065743B2

(12) United States Patent
Bakshi et al.

(10) Patent No.: US 9,065,743 B2
(45) Date of Patent: Jun. 23, 2015

(54) DETERMINING CONNECTIVITY IN A FAILED NETWORK

(75) Inventors: Yury Bakshi, Morganville, NJ (US); Carolyn Roche Johnson, Holmdel, NJ (US); Herbert B. Shulman, Colts Neck, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 496 days.

(21) Appl. No.: 12/647,026

(22) Filed: Dec. 24, 2009

(65) Prior Publication Data

US 2011/0158083 A1 Jun. 30, 2011

(51) Int. Cl.
*H04L 12/24* (2006.01)
*H04L 12/751* (2013.01)
*H04L 12/715* (2013.01)

(52) U.S. Cl.
CPC .............. *H04L 41/12* (2013.01); *H04L 45/02* (2013.01); *H04L 45/04* (2013.01); *H04L 45/46* (2013.01)

(58) Field of Classification Search
USPC ......... 370/225, 229, 252, 254, 230, 235, 237, 370/238, 256, 257, 379, 382, 389, 437, 370/462; 709/217, 223, 224, 238, 241
See application file for complete search history.

(56) References Cited

U.S. PATENT DOCUMENTS

| 5,455,865 | A | | 10/1995 | Perlman |
| 5,581,543 | A | * | 12/1996 | Natarajan ...................... 370/221 |
| 6,069,895 | A | * | 5/2000 | Ayandeh ....................... 370/399 |
| 6,098,107 | A | | 8/2000 | Narvaez-Guarnieri et al. |
| 6,356,911 | B1 | * | 3/2002 | Shibuya ............................... 1/1 |
| 6,564,145 | B2 | * | 5/2003 | Kim et al. ...................... 701/533 |
| 6,628,649 | B1 | * | 9/2003 | Raj et al. ....................... 370/360 |
| 6,999,459 | B1 | * | 2/2006 | Callon et al. .................. 370/400 |
| 7,058,016 | B1 | | 6/2006 | Harper |
| 7,280,481 | B2 | * | 10/2007 | Rong ............................. 370/238 |
| 7,298,704 | B2 | | 11/2007 | Kodialam et al. |
| 7,315,897 | B1 | | 1/2008 | Hardee et al. |
| 7,457,286 | B2 | * | 11/2008 | Alexander, Jr. ............... 370/379 |
| 7,468,946 | B2 | * | 12/2008 | Yucel ............................ 370/235 |
| 7,539,263 | B2 | * | 5/2009 | Jung et al. ..................... 375/267 |
| 7,792,987 | B1 | * | 9/2010 | Vohra et al. ................... 709/238 |
| 7,911,944 | B2 | * | 3/2011 | Chiabaut et al. ............. 370/229 |
| 8,068,408 | B2 | * | 11/2011 | Ansari et al. .................. 370/216 |
| 2002/0078232 | A1 | * | 6/2002 | Simpson et al. ............. 709/238 |
| 2003/0046390 | A1 | * | 3/2003 | Ball et al. ...................... 709/224 |
| 2003/0051195 | A1 | * | 3/2003 | Bosa et al. ...................... 714/43 |
| 2003/0097438 | A1 | * | 5/2003 | Bearden et al. ............... 709/224 |

(Continued)

*Primary Examiner* — Michael Thier
*Assistant Examiner* — Eric Myers
(74) *Attorney, Agent, or Firm* — Scott P. Zimmerman, PLLC (57) ABSTRACT

The disclosed technology, in one embodiment, involves a method that improves the execution speed of graph algorithms that are commonly used by network service providers for network analysis and/or design. The disclosed technology can be used to provide significant efficiency improvements when applied to networks that are separated into several isolated fragments ("fragmented networks") due to severe damage that may be caused by either natural disaster (such as hurricanes or earthquakes), or planned adversary attacks. In one embodiment of the disclosed technology, a graph algorithm, that is used to determine a characteristic of the network, is not applied directly to the whole network/graph. Instead, the graph algorithm is applied to isolated network/graph fragments that are identified, for example, by using a fragment discovery algorithm. The graph algorithm is then applied to one or more relevant fragments. The results may be combined to obtain a network wide result.

4 Claims, 7 Drawing Sheets

(56) References Cited

U.S. PATENT DOCUMENTS

| | | | |
|---|---|---|---|
| 2003/0189920 A1* | 10/2003 | Erami et al. | 370/351 |
| 2004/0082338 A1* | 4/2004 | Norrgard et al. | 455/452.2 |
| 2007/0248059 A1* | 10/2007 | Jain et al. | 370/338 |
| 2008/0031257 A1* | 2/2008 | He | 370/395.31 |
| 2008/0037562 A1* | 2/2008 | Saleh et al. | 370/400 |
| 2008/0192654 A1* | 8/2008 | Block et al. | 370/257 |
| 2008/0279101 A1* | 11/2008 | Wu et al. | 370/235 |
| 2008/0310430 A1* | 12/2008 | He | 370/400 |
| 2010/0131912 A1* | 5/2010 | Ispir et al. | 716/9 |
| 2010/0278071 A1* | 11/2010 | Hattori | 370/254 |
| 2012/0300774 A1* | 11/2012 | Casey et al. | 370/390 |

\* cited by examiner

| UNCOLORED-ptr=111 | COLOR1-ptr=0 | COLOR2-ptr=0 | COLOR3-ptr=0 |

| NODE 111 | Next uncolored | COLOR=0 |
|---|---|---|
| NODE 112 | Next uncolored | COLOR=0 |
| NODE 113 | Next uncolored | COLOR=0 |
| NODE 116 | Next uncolored | COLOR=0 |
| NODE 117 | Next uncolored | COLOR=0 |
| NODE 118 | Next = last | COLOR=0 |

| UNCOLORED-ptr=111 | COLOR1-ptr=0 | COLOR2-ptr=0 | COLOR3-ptr=0 |

| NODE 111 | Next uncolored | COLOR=0 | NEIGHBOR={116} |
|---|---|---|---|
| NODE 112 | Next uncolored | COLOR=0 | NEIGHBOR=0 |
| NODE 113 | Next uncolored | COLOR=0 | NEIGHBOR={117} |
| NODE 116 | Next uncolored | COLOR=0 | NEIGHBOR={111.118} |
| NODE 117 | Next uncolored | COLOR=0 | NEIGHBOR={113} |
| NODE 118 | Next = last | COLOR=0 | NEIGHBOR={116} |

| UNCOLORED-ptr=112 | COLOR1-ptr=111 | COLOR2-ptr=0 | COLOR3-ptr=0 |

| NODE 111 | Next COLOR1    | COLOR=1 | NEIGHBOR={116}     |
|----------|----------------|---------|---------------------|
| NODE 112 | Next uncolored | COLOR=0 | NEIGHBOR=0          |
| NODE 113 | Next uncolored | COLOR=0 | NEIGHBOR={117}      |
| NODE 116 | Next COLOR1    | COLOR=1 | NEIGHBOR={111.118}  |
| NODE 117 | Next = last    | COLOR=0 | NEIGHBOR={113}      |
| NODE 118 | Next = last    | COLOR=1 | NEIGHBOR={116}      |

| UNCOLORED-ptr=0 | COLOR1-ptr=111 | COLOR2-ptr=112 | COLOR3-ptr=113 |

| NODE 111 | Next COLOR1 | COLOR=1 | NEIGHBOR={116}     |
|----------|-------------|---------|---------------------|
| NODE 112 | Next=last   | COLOR=2 | NEIGHBOR=0          |
| NODE 113 | Next COLOR3 | COLOR=3 | NEIGHBOR={117}      |
| NODE 116 | Next COLOR1 | COLOR=1 | NEIGHBOR={111.118}  |
| NODE 117 | Next = last | COLOR=3 | NEIGHBOR={113}      |
| NODE 118 | Next = last | COLOR=1 | NEIGHBOR={116}      |

DETERMINING CONNECTIVITY IN A FAILED NETWORK

FIELD

The disclosed technology, in one embodiment, relates generally to determining connectivity in a failed network.

BACKGROUND

Network service providers constantly strive to provide service to their customers during both normal operation and during severe network damage. Some of the customers, such as government and law enforcement agencies, require service during severe network damage when multiple network elements fail because of natural disasters (such as hurricanes or earthquakes), or planned adversary attacks. (The term "network elements" includes, for example, network nodes or links.) Such damage scenarios often divide a service provider network into isolated fragments. Such network fragmentation typically causes the loss of connectivity between critical service equipment connected to different isolated network fragments, making service delivery very difficult.

Network service providers employ modeling to evaluate network survivability during various severe damage scenarios. The total number of failure scenarios to analyze is often astronomically large. For example, in a medium size network with 25 nodes and 100 links the number of possible combinations of single, dual, triple and quadruple link and node failure scenarios is over ten million. The total number of multiple failure scenarios is over $4.25 \times 10^{37}$. Hence, it is extremely important to have faster modeling algorithms for evaluating network survivability. The faster the modeling algorithm the more failure scenarios that can be analyzed and the more accurate the resultant survivability analysis.

SUMMARY

The disclosed technology, in one embodiment, involves a method that improves the execution speed of graph algorithms that are commonly used by network service providers for network analysis and/or design. The disclosed technology can be use to provide significant efficiency improvements when applied to networks that are separated into several isolated fragments ("fragmented networks" or "subnetwork fragments") due to severe damage that may be caused by either natural disaster (such as hurricanes or earthquakes), or planned adversary attacks.

In one embodiment of the disclosed technology, a graph algorithm, that is used to determine a characteristic of the network, is not applied directly to the whole network/graph. Instead, the graph algorithm is applied to isolated network/graph fragments. Isolated network/graph fragments may be identified using a fragment discovery algorithm. The graph algorithm is then applied to one or more relevant fragments. The results may be combined to obtain a network wide result. The algorithm computational time can be significantly reduced by applying the fragment discovery algorithm prior to applying the graph algorithm, in accordance with the disclosed technology.

Although the disclosed technology is discussed in the context of a hypothetical service provider network, the technology is applicable to other types of problems where a network and/or a graph is separated into several isolated fragments.

DETAILED DESCRIPTION

Managing telecommunication networks involves the modeling/analysis of network survivability: i.e., the ability of the network to continue to operate effectively though portions of the system may be damaged or destroyed. One of the important aspects of survivability planning is assuring connectivity between various network equipment that are critical for completing communications during severe network damage. Network connectivity may be severely impacted when multiple network failures cause the network to separate into isolated fragments, resulting in loss of connectivity between critical network elements in different network fragments. The disclosed technology reduces execution time of graph algorithms, such as the Dijkstra Shortest Path Algorithm, used to analyze the fragmented network/graph.

Figure 2:
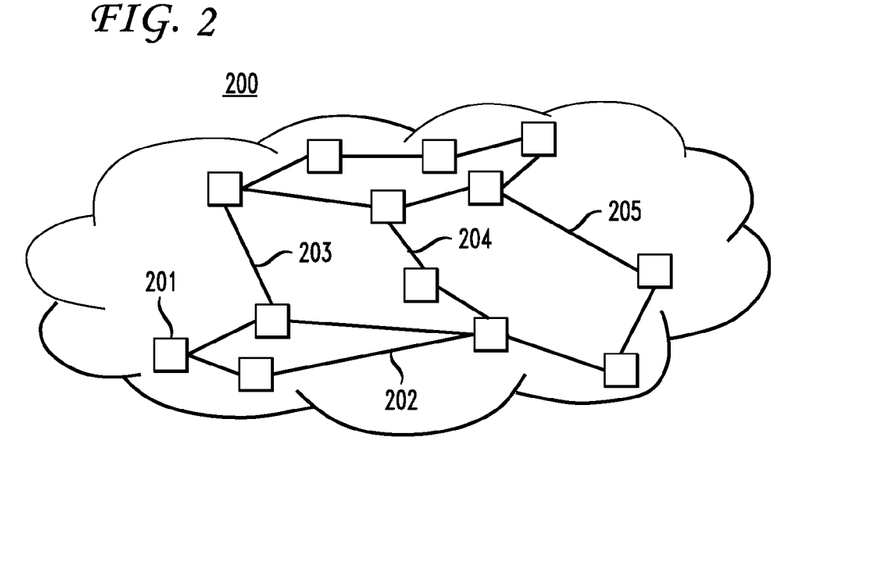
FIG. 2 is a schematic representation of a network with 13 Nodes.

Typical communication in service provider networks requires connectivity between different network elements, such as network nodes and links. For illustrative purposes, FIG. 2 shows a network, 200, consisting of 13 nodes (e.g., IP routers), an exemplary one of which is identified as 201, and 16 links (shown as solid lines) between pairs of nodes, an exemplary link being identified as 202.

Figure 3:
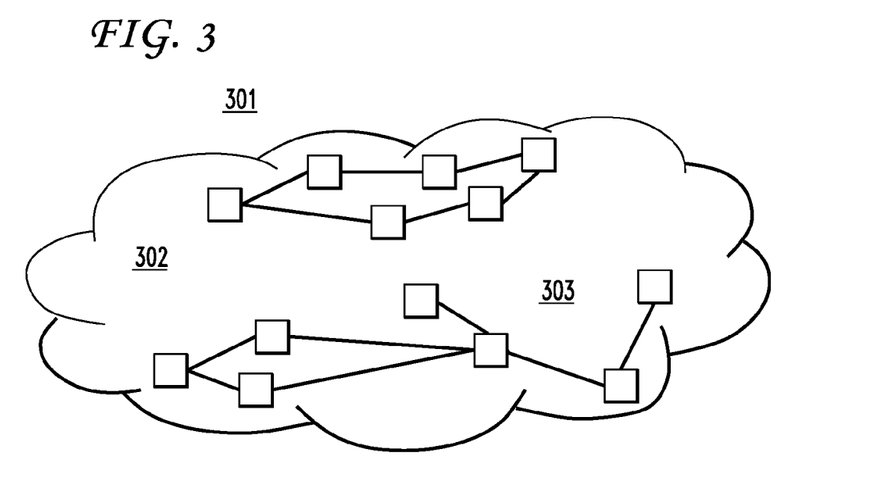
FIG. 3 is a schematic representation of a network with 13 Nodes after the failure of three Links

In service provider networks, the connectivity between all nodes is usually operational as long as there are no network failures. It is also customary to engineer the service provider network so that it can withstand single node or link failure without loss of connectivity. This is accomplished, for example, by rerouting traffic around the failed node. In this way, connectivity between all nodes generally continues to exist during single network node or single network link failure. However, simultaneous failures of three links, for example, the links identified as 203, 204 and 205 in FIG. 2, separate the original network into two isolated fragments and lead to the "damaged" network architecture shown in FIG. 3. In FIG. 3, the network elements in the network fragment identified as 302 have lost all connectivity with any network elements in the network fragment identified as 303. (The isolated network fragment may also be called a subnetwork fragment, or a fragment subnetwork.)

Figure 1:
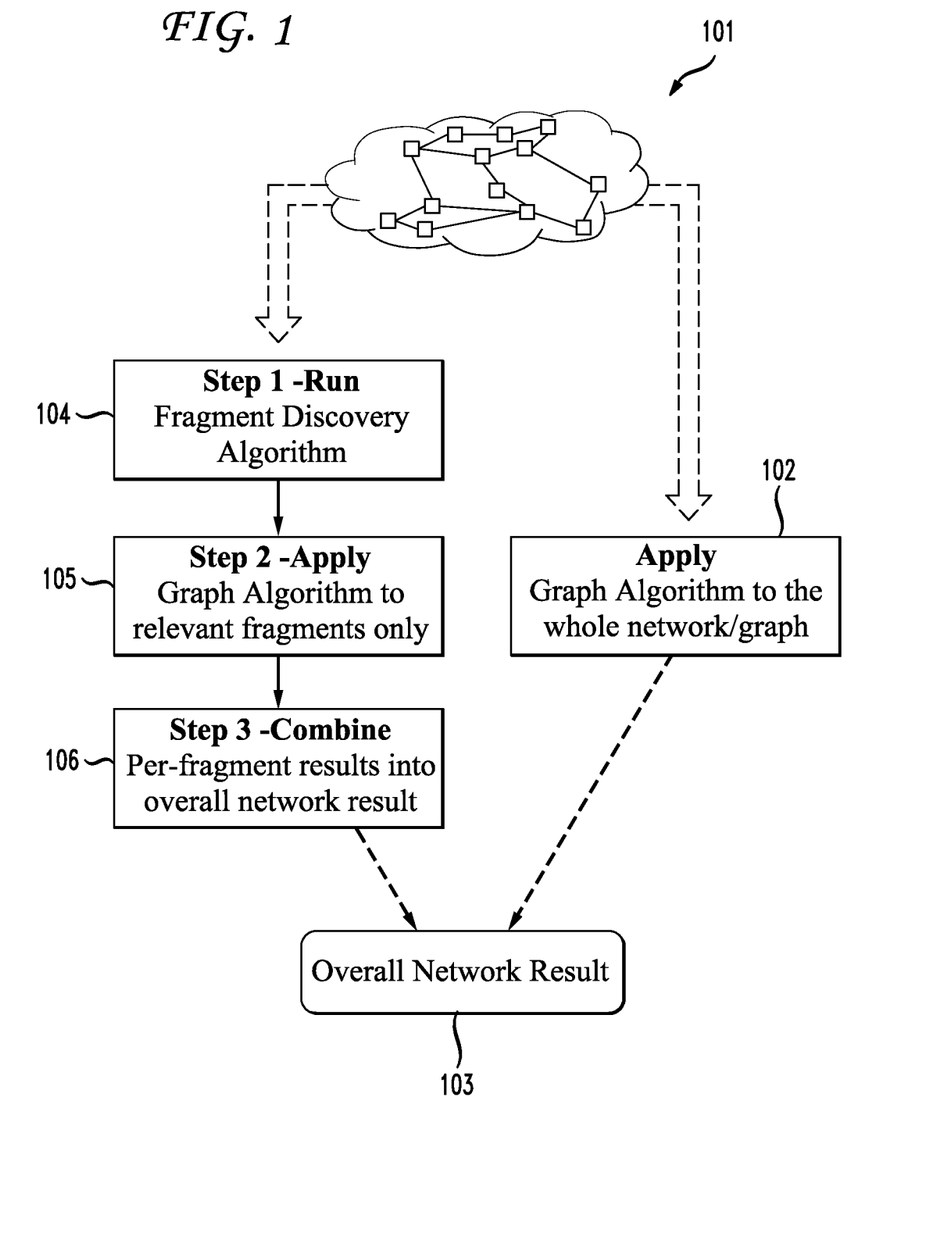
FIG. 1 is a schematic representation of the disclosed technology compared to other methods of analyzing and/or modeling networks and/or graphs.

As illustrated in the FIG. 1, in one embodiment of the disclosed technology, the graph algorithm is not applied directly to the whole network/graph during the analysis of network survivability. Instead, the graph algorithm is applied to a plurality of isolated network/graph fragments. Isolated network/graph fragments are found using a fragment discovery algorithm. The graph algorithm is then applied to one or more relevant fragments. The algorithm computational time can be significantly reduced by applying the fragment discovery algorithm prior to applying the graph algorithm, in accordance with the disclosed technology.

In FIG. 1, 101 is schematic representation of a network that is to be analyzed. The method used in 102 involves applying the network/graph algorithm to the entire network to obtain an overall network result at 103. As discussed, this methodology is impractical when modeling survivability of large, real world networks.

The disclosed technology is shown schematically on the left side of the FIG. 1. In this portion of FIG. 1, a fragment discovery algorithm is applied to the network/graph at 104. At 105 the existing network/graph algorithm is then applied to relevant network fragments. At 106, the per-fragment analyses are combined to obtain an overall network result.

As discussed, the analysis of network survivability under severe damage scenarios requires fast graph algorithms to analyze a modern telecommunication networks. The disclosed technology increases the speed of network analysis and therefore enables the analysis of more failure scenarios. Using the disclosed technology, network performance under severe damage scenarios can be more rapidly and effectively analyzed, thereby enabling network service providers to improve the quality of network analysis and design and in that way improve service during failures.

Although the disclosed technology has been discussed in terms of communication networks, in alternative embodiments the disclosed technology may be applied to any network or graph problem, such as for example, airline routes or other transportation routing. In other embodiments, the links or nodes of the network may be weighted for the calculations, depending on factors such as, for example, cost, availability, security, criticality, etc.

A Specific Embodiment

Accelerating Dijkstra All-Pairs, and Dijkstra Single-Source, Shortest Paths Algorithms In this specific embodiment, the disclosed technology is applied using the well known Dijkstra All-Pairs Shortest Path Algorithm to illustrate the computational complexity reduction that results when fragmented network/graphs are analyzed in accordance with the disclosed technology. The computational complexity of a problem is a measure of the computational resources, typically time, required to solve the problem. The time that is needed for a particular algorithm to solve the problem is measured or computed. This time depends, for example, on the implementation of the algorithm as well as on the computer on which the program is running. The theory of computational complexity provides a measure of complexity that is largely independent of implementation details and the computer used.

If the Dijkstra All-Pairs Shortest Paths Algorithm is applied to the fragmented network in FIG. 3 as a whole in order to find the shortest paths between all pairs of nodes in the network the result will be obtained in $O(V^3)$ time, where V is the number of network nodes/graph vertices. In this calculation, weights, which are not shown in FIG. 3, are usually associated with the links. These weights can reflect one or more characteristics of interest for each respective link, such as, for example, length, capacity, or criticality of the given link.

In accordance with the disclosed technology, however, the computational complexity can be reduced by 1) discovering all isolated network fragments, and 2) using the Dijkstra All-Pairs Shortest Path Algorithm to find the shortest paths between all pairs of nodes within each network fragment. Since the network fragments are isolated, no path exists in FIG. 4 between any node in network fragment 401 and any node in network fragment 402. In other words the length of the shortest path between any pair of nodes in different fragments is infinity.

One can discover isolated network fragments using popular minimum spanning tree algorithms such as Kruskal's, Prim's or Sollin's algorithms. Such algorithms typically complete in O(E log V) time, where E is the number of links/edges, and V is number of nodes/vertices in the network/graph. The computational complexity for a network fragment discovery algorithm can be further reduced to O(E) by using, for example, the methodology described in the Appendix. Applying step 104 in FIG. 1 to the fragmented network shown in FIG. 3, using a network fragment discovery algorithm, may result in two network fragments that are isolated from each other, as shown schematically in FIG. 4.

Figure 4:
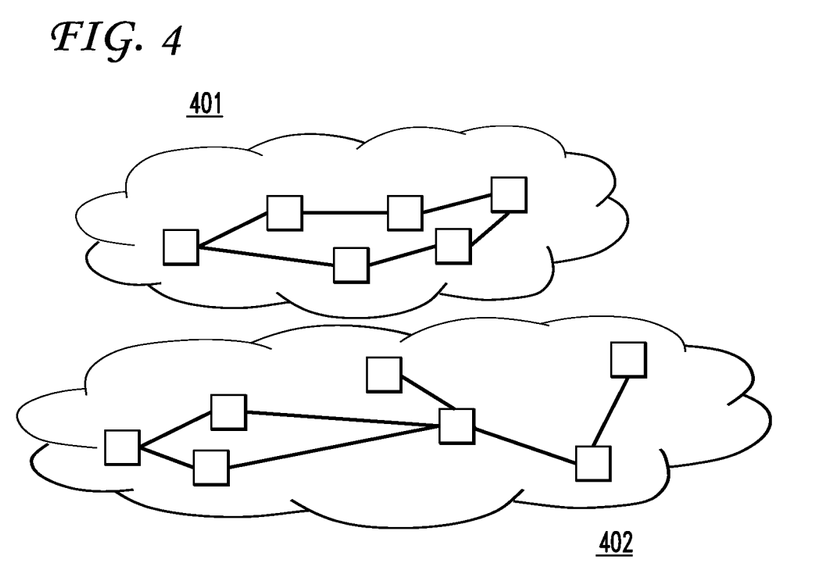
FIG. 4 is a schematic representation of the two fragmented networks of FIG. 3 shown as separate subnetworks to which a network/graph algorithm is applied

When the Dijkstra All-Pairs Shortest Path Algorithm is applied to each isolated network fragment in FIG. 4, in accordance with step 105 of the disclosed technology shown in FIG. 1, the computational complexity is $$\sum_{i=1}^{K} O(V_i^3),$$

where K is the number of fragments and $V_i$ is the number of nodes/vertices in the i-th fragment. Hence, the total computational complexity of the disclosed technology, as applied to Dijkstra All-Pairs Shortest Path Algorithm, is $$O(E) + \sum_{i=1}^{K} O(V_i^3).$$

Note that, in step 106 in FIG. 1 of the disclosed technology, we assumed insignificant computational complexity, in comparison to steps 104 and 105 in FIG. 1. Indeed, in case of the Dijkstra All-Pairs Shortest Path Algorithm, the only activity performed in step 106, for this example, is assigning infinite length to the shortest paths between any pair of nodes located in different network fragments. For the rest of the node pairs (i.e., when both nodes are located in the same network fragment) the shortest paths were already found in step 105.

Expected computational performance improvements depend on network/graph structure and analyzed failure scenarios. If, for example, the typical studied damage scenario results in several network fragments with the largest fragment size of about 80% of the total network size, then the computational complexity for the disclosed technology is less than $O(E)+0.8^3 \times O(V^3)+0.2^3 \times O(V^3)$. Since $E<V^2$, this result can be reduced to about $0.5 \times O(V^3)$, or about the half of the computational complexity for the "standard" Dijkstra All-Pairs Shortest Path Algorithm.

If the typical size of the largest fragment is about 0.5V, then the complexity reduction is more significant: less than $0.25 \times O(V^3)$ for the disclosed technology vs. $O(V^3)$ for the "standard" Dijkstra All-Pairs Shortest Path Algorithm. On the other hand, if for the typical analyzed failure the largest resulting network fragment is about the same size as the whole network, then the disclosed technology computational complexity becomes $O(V^3)$, i.e., about the same as for the "standard" Dijkstra All-Pairs Shortest Path Algorithm.

Similar analysis can be carried out for Dijkstra Single-Source shortest paths algorithm. If we apply this algorithm to the network in FIG. 2 as a whole, in order to find shortest paths between any given node and all the other nodes in the network, results are obtained in $O(V^2)$ time. The disclosed technology, on the other hand, will complete in $O(E)+O(V_A^2)$, where $V_A$ is the number of nodes/vertices in the fragment containing node A. If, for example, the typical studied damage scenario results in several network fragments with the largest fragment size of about 80% of the total network size, then the computational complexity for the disclosed technology is less than $O(E)+0.8^2 \times O(V^2)$. Note that we need to apply the Dijkstra Single-Source shortest paths algorithm only to the network fragment containing node A. This is the only relevant fragment in this case, since we already know that the no path exists between node A and any other node in different network fragments. Note also that we again assume insignificant computational complexity in FIG. 1, step 106, in comparison to steps 104 and 105 of FIG. 1. Indeed, in this case of the Dijkstra Single-Source Shortest Path Algorithm, the only action performed in step 106 is assigning infinite lengths to the shortest paths between the given node A and any other node in a different network fragment. For the rest of the node pairs (i.e., between the node A and any other node located in the same network fragment) the shortest paths were already found in step 105.

In sparsely connected networks/graphs (such as most of the telecommunication networks) the number of links grows no faster than proportionally to the number of nodes, i.e., $E=O(V)$. In such networks/graphs, computational complexity can be reduced to about $0.64 \times O(V^2)$, or about ⅔ of the computational complexity for the "standard" Dijkstra Single-Source Shortest Paths Algorithm. If the typical size of the largest fragment is about 0.5V, then the complexity reduction is more significant: less than $0.25 \times O(V^2)$ for the disclosed technology vs. $O(V^2)$ for the "standard" Dijkstra Single-Source Shortest Path Algorithm.

The disclosed technology may improve performance for any qualified graph algorithm, i.e., a graph algorithm that satisfies the following two suitability conditions. These are sufficient, but not necessary, conditions for the disclosed technology.
1. The graph algorithm requires $O(V^2)$ or longer to complete, where V is the number of network nodes/graph vertices.
2. The results obtained by applying the graph algorithm to each isolated network fragment separately can be combined together to obtain the overall network result, for example, as described earlier for Dijkstra All-Pairs, and Single-Source, Shortest Path Algorithms.

While this disclosure has been in terms of network nodes, it should be understood that the disclosed technology can be applied to any network element, for example, nodes and/or links in a communications network or to any other environment that can be represented by a graph.

Computer instructions to implement the disclosed technology on a computer may be encoded on a computer readable storage medium for later execution. The term computer readable storage medium encompasses many forms known to those of ordinary skill in this art. In alternative embodiments, the term computer readable storage medium may be limited to physical or tangible storage media such as an EPROM, a CD, or a DVD or other physical storage media.

Figure 5:
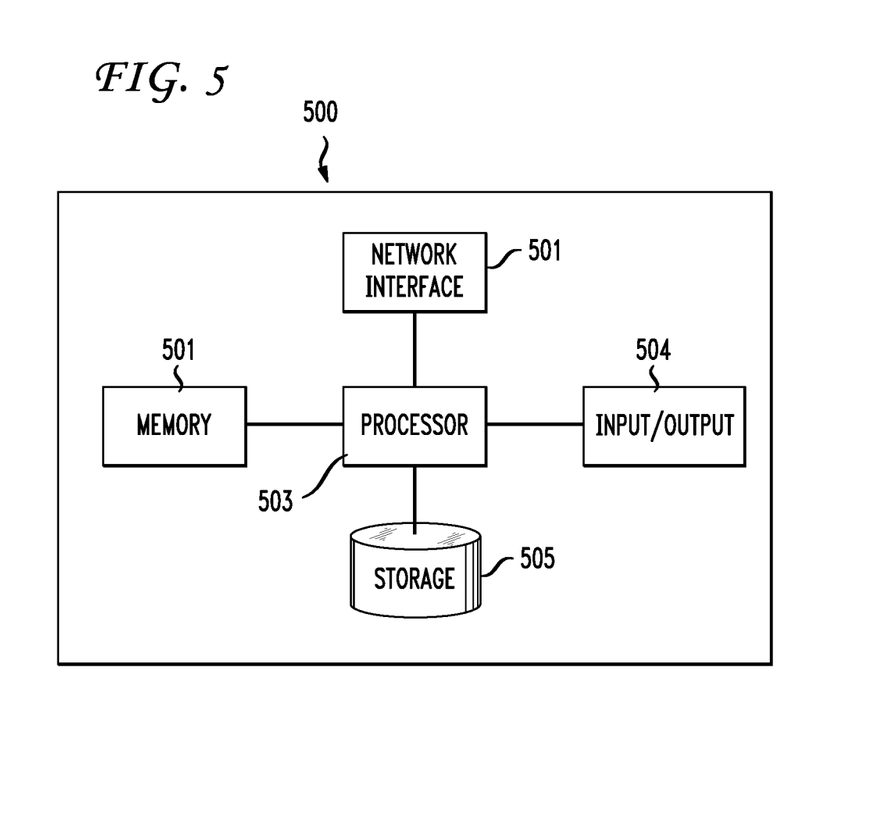
FIG. 5 is a schematic representation of a computer that can be used in practicing the disclosed technology

FIG. 5 shows a high-level block diagram of a computer that may be used to carry out the disclosed technology. Computer 500 contains a processor 503 that controls the overall operation of the computer by executing computer program instructions which define such operation. The computer program instructions may be stored in a storage device 505 (e.g., magnetic disk, database) and loaded into memory 502 when execution of the computer program instructions is desired. Thus, the computer operation will be defined by computer program instructions stored in memory 502 and/or storage 505, and the computer will be controlled by processor 503 executing the computer program instructions. Computer 500 also includes one or more output network interfaces 501 for communicating with other devices. Computer 500 also includes input/output 504 representing devices which allow for user interaction with the computer 500 (e.g., display, keyboard, mouse, speakers, buttons, etc.). One skilled in the art will recognize that an implementation of an actual computer will contain other components as well, and that FIG. 5 is a high level representation of some of the components of such a computer for illustrative purposes. It should also be understood by one skilled in the art that the method of the current disclosed technology may be implemented on a device such as is shown in FIG. 5 by, for example, utilizing appropriate computer instructions as described herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiment of the disclosed technology shown and described herein are only illustrative of the principles of the claimed invention and that various modifications may be implemented by those skilled in the art without departing from the scope and spirit of the invention. Those skilled in the art could implement various other feature combinations without departing from the scope and spirit of the invention. Accordingly, it should be understood that the claimed invention may be broader than any given embodiment described in this specification, or than all of the embodiments when viewed together. Rather these embodiments are meant to describe aspects of the disclosed technology, not necessarily the specific scope of any given claim.

APPENDIX

An Efficient Method for Discovering Isolated Network Fragments

Figure 6:
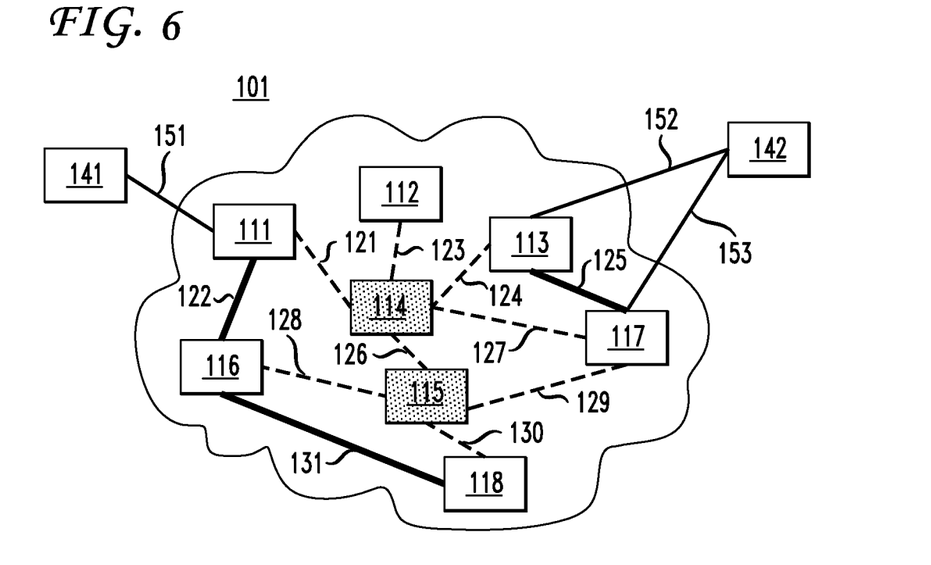
FIG. 6 is a schematic representation of a damaged network

FIG. 6 illustrates damaged network 101, in which backbone nodes 114 and 115 have suffered damage and are unavailable to handle network traffic. FIG. 6 illustrates damaged nodes 114 and 115 grayed out, and the links that connect to those nodes (e.g., backbone links 121, 123, 124, 126, 127, 128, 129 and 130) as dashed lines.

Figure 7:
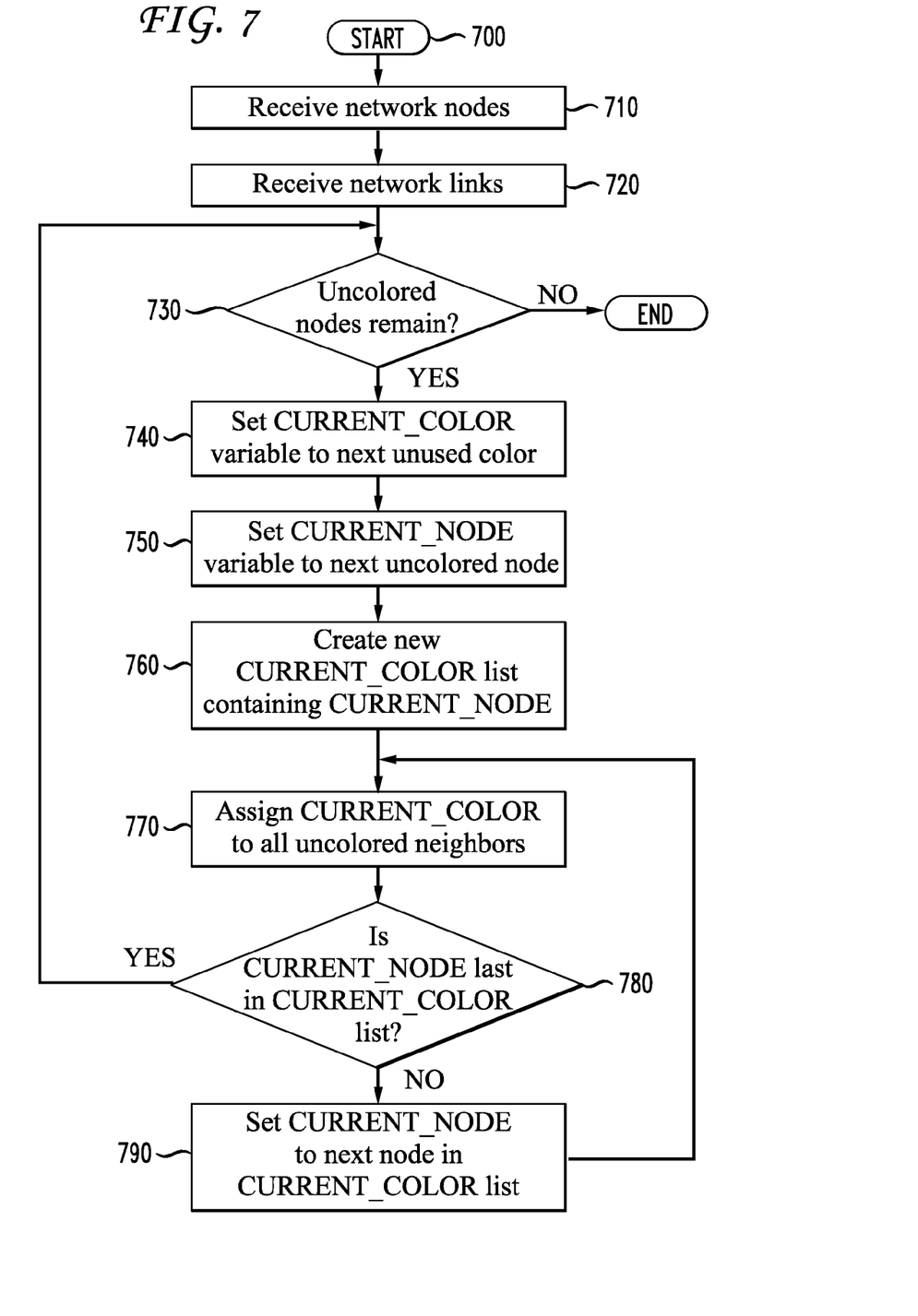
FIG. 7 is a schematic representation of an efficient method for discovering isolated network fragments.
Figure 8A:
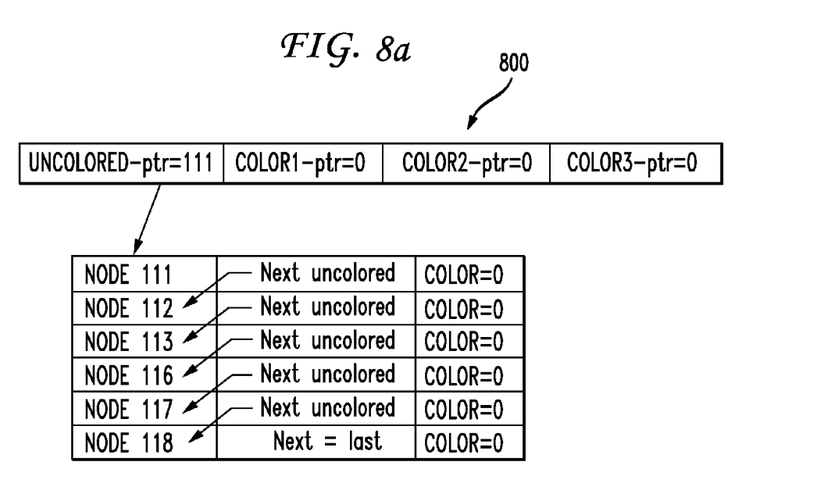
FIG. 8a-8d are schematic representations of arrays that result in various stages of the method of FIG. 7

The method, with computational complexity of O(E), where E is the number of links/edges in the network/graph, is shown schematically in FIG. 7. In this FIG. 7, at 710 information on functioning network nodes is received. The information is stored in an array with a size N equal to the number of nodes in the scenario to be analyzed. It should be noted that only functioning nodes are received in this step (e.g., in the damaged network 101, of FIG. 6, nodes 111, 112, 113, 116, 117 and 118, but not nodes 114 and 115). The array may initially include a pointer from the array name to the first node and from each node to the next node. FIG. 8a illustrates an exemplary initial array 800 for the damaged network 101 of FIG. 6, as described above.

In step 720, information on network links is received. For a link between two nodes A and B, the array entry for node A will reflect that node B is its neighbor, and vice versa. As in step 710, only functioning links are received in step 720. FIG.

Figure 8B:
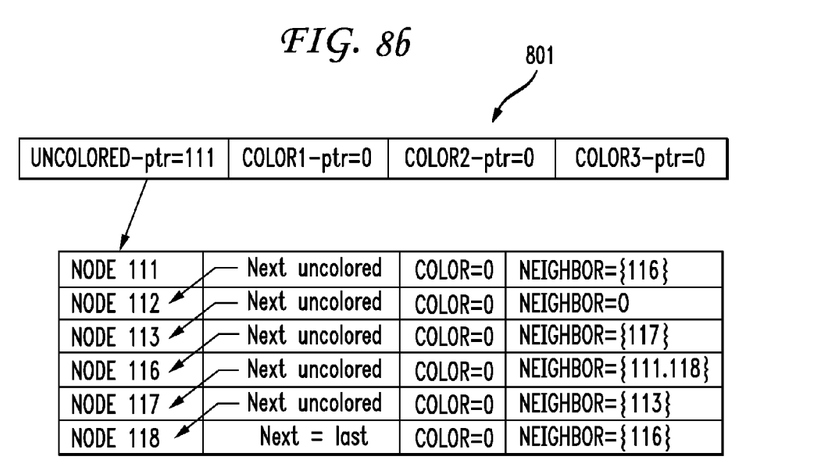

8b illustrates exemplary linked array 801, which is the array 800 of FIG. 8a with neighboring nodes added.

In this method, each element in the network is assigned a unique identifier. In this description, the unique identifiers are colors, which may be preferable for a graphical representation of the fragmented network. However, those of skill in the art will understand that the unique identifiers may also be numbers, letters, words, place designations, network component designations, etc., or any other type of identifier that may be used to distinguish the various network elements from one another.

At 730, the method determines whether any uncolored nodes remain. If so, the method continues to step 740. If all of the nodes have been colored, the method terminates.

In step 740, the next, unused color is selected. For example, when the method begins, no colors have been used, and COLOR1 is the first unused color. For example, COLOR1 may be yellow.

In steps 750 and 760, the first node that has not yet been assigned a color is removed from the uncolored list and added to the list for the currently selected color. The selected node is marked with the appropriate color in the node array. Additionally, in step 770 all uncolored neighbors of the selected node are assigned the selected color. For example, if the selected node is 111 and the selected color is yellow, then node 111 and node 115, an uncolored neighbor of node 111 will be assigned the color yellow. Also in step 770, all newly colored nodes are removed from the uncolored node list and appended to the end of the current color node list.

Pointers are updated to reflect the new first uncolored node, the first node of the current color, and any subsequent nodes of the current color. Subsequently, in the loop that includes steps 770-790, all uncolored neighbors of the remaining entries in the group are assigned the current color. Pointers are again updated. Those of skill in the art will understand these steps may continue to repeat as long as new nodes are added to the group.

Continuing with the above example, node 118 is assigned the color yellow in this step, as it is a neighbor of step 115. Once it is determined, in step 780, that the current node is the last in the list (e.g., no more neighboring nodes have been assigned the current color), the method returns to step 730, where it is again determined whether there are uncolored nodes remaining. If so, the method returns to step 740 and continues with the next color, to be assigned to the next fragment of the network. If no uncolored nodes remain, the method terminates.

The application of the method may proceed as follows. In steps 710 and 720, the survived nodes (111, 112, 113, 116, 117 and 118) and links (122, 125, 131) are received, resulting in the node array as illustrated in FIG. 8b. In step 740, the first color (e.g., yellow) is selected for assignment. In steps 750 and 760, the first uncolored node 111 is assigned the first color COLOR1. In step 770, node 116, a neighbor of node 111, is also assigned COLOR1.

Figure 8C:
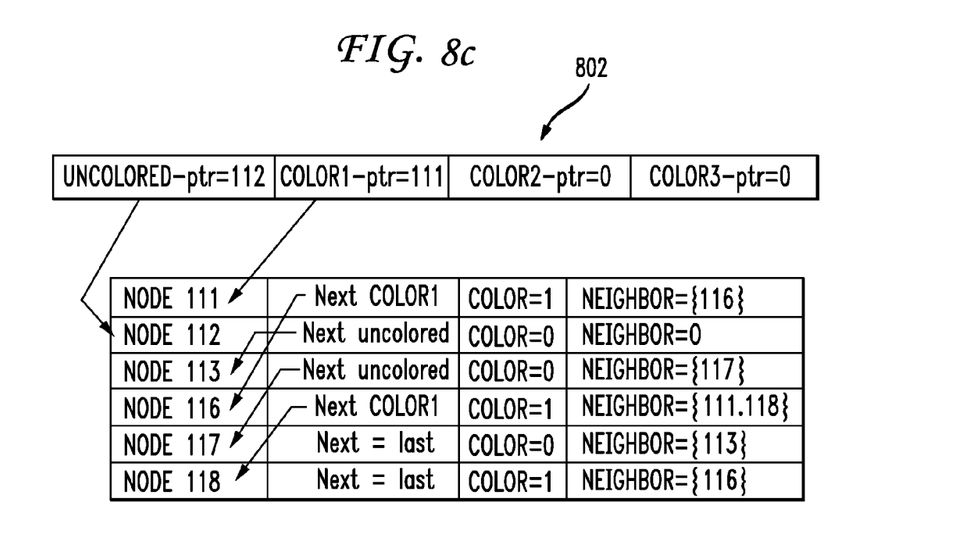

Next, in steps 780 and 790, the method continues with the analysis of the neighbors of node 116. In step 770, COLOR1 is assigned to node 118, as it is a neighbor of node 116—FIG. 8c illustrates array 802, which is the array 800 at this point in the exemplary application of the method. At this point, the discovery of the first (e.g., "yellow") network fragment is completed.

Nodes 111, 115 and 118 have now been assigned COLOR1 and nodes 112, 113 and 117 remain uncolored. The uncolored pointer is to node 112, the first uncolored node, and subsequently to nodes 113 and 117; the COLOR1 pointer is to node 111, and subsequently to nodes 116 and 118.

Continuing with the exemplary application of the method 700, after step 780 the method returns to step 730, in which it is determined that uncolored nodes remain in the uncolored node list. Thus, the method progresses to step 740, where COLOR2 (e.g., green) is selected. In step 750, COLOR2 is assigned to the first remaining uncolored node, node 112. The COLOR2 pointer is assigned to node 112, and the uncolored pointer is assigned to node 113, the new first, remaining uncolored node. No additional nodes are assigned COLOR2 in step 770, as node 112 borders no other functioning nodes. At this point, the discovery of the second (e.g., "green") network fragment is completed. In step 780, the method determines that, the current node 112 is the last in the COLOR2 list, so it returns to step 730, in which it is again determined that uncolored nodes remain. So the method again proceeds to step 740 to discover the next network fragment.

Figure 8D:
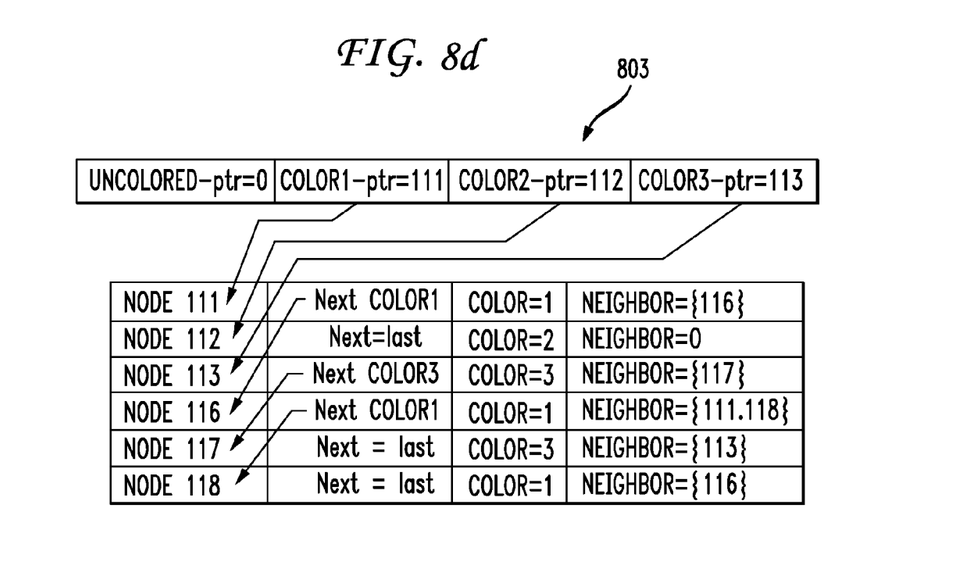

In the third iteration of step 740, COLOR3 (e.g., blue) is selected. In step 760, COLOR3 is assigned to the first uncolored node, node 113. COLOR3 is then also assigned to node 117, as a neighbor of color 113, in step 770. The COLOR3 pointer is updated to point to node 113, and subsequently from node 113 to node 117. At this point, the discovery of the third (e.g., "blue") network fragment is completed. The uncolored pointer is eliminated, as no uncolored nodes remain. The method again returns to step 730, in which it is determined that no uncolored nodes remain, and the method terminates. FIG. 8d illustrates the array 803, which is the array 300 at the conclusion of the execution of the exemplary method of FIG. 7

The invention claimed is:

1. A method, comprising:
   executing, by a processor, an algorithm that discovers failed network fragments in a network, each one of the failed network fragments having no connectivity path to any other failed network fragment;
   determining, by the processor, a shortest path between nodes in the network;
   assigning, by the processor, an infinite length between two nodes in different ones of the failed network fragments;
   applying, by the processor, a graphing algorithm, after discovery, to each one of the failed network fragments discovered by the algorithm;
   generating, by the processor, a result of the graphing algorithm for each one of the failed network fragments;
   combining, by the processor, results of the graphing algorithm for all the failed network fragments; and
   assigning, by the processor, a combined result to the network.

2. The method of claim 1, further comprising determining a connectivity distance between two network nodes in the network.

3. A non-transitory computer readable storage medium encoded with computer executable instructions which, when executed by a computer, implement the operations of:
   executing an algorithm that discovers failed network fragments in a network, each one of the failed network fragments having no connectivity path to any other failed network fragment;
   determining a shortest path between nodes in the network;
   assigning an infinite length between two nodes in different ones of the failed network fragments;
   applying a graphing algorithm, after discovery, to each one of the failed network fragments discovered by the algorithm;
   generating a result of the graphing algorithm for each one of the failed network fragments;

combining results of the graphing algorithm for all the failed network fragments; and assigning a combined result to the network.

4. A system, comprising:

a processor; and a memory storing code that when executed causes the processor to perform operations, the operations comprising:

executing an algorithm that discovers failed network fragments in a network, each one of the failed network fragments having no connectivity path to any other failed network fragment;

identifying a pair of nodes in different ones of the failed network fragments;

determining a shortest path between two nodes in the network;

assigning an infinite length to the shortest path in response to the two nodes located in different ones of the failed network fragments;

applying a graphing algorithm to each one of the failed network fragments discovered by the algorithm;

generating a result of the graphing algorithm for each one of the failed network fragments;

combining results of the graphing algorithm for all the failed network fragments; and assigning a combined result to the network.

\* \* \* \* \*